Oct. 21, 1958    H. A. HADLEY ET AL    2,857,049
CHECK WEIGHERS
Filed Feb. 19, 1954    5 Sheets-Sheet 1

FIG.1.

INVENTORS
HARLAN A. HADLEY
LESTER D. SINGLETON
BY *Henry Sherman*
ATTORNEY.

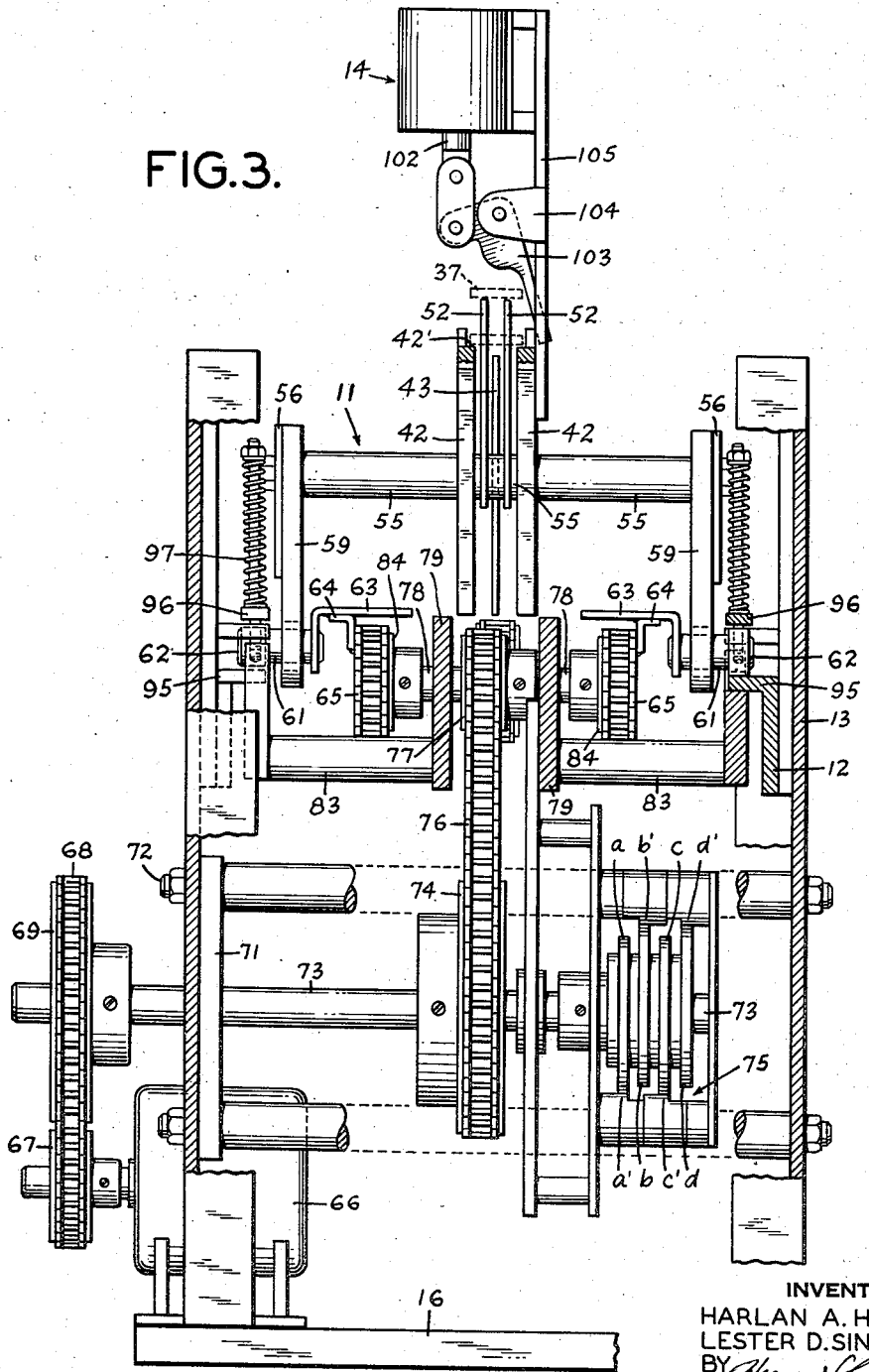

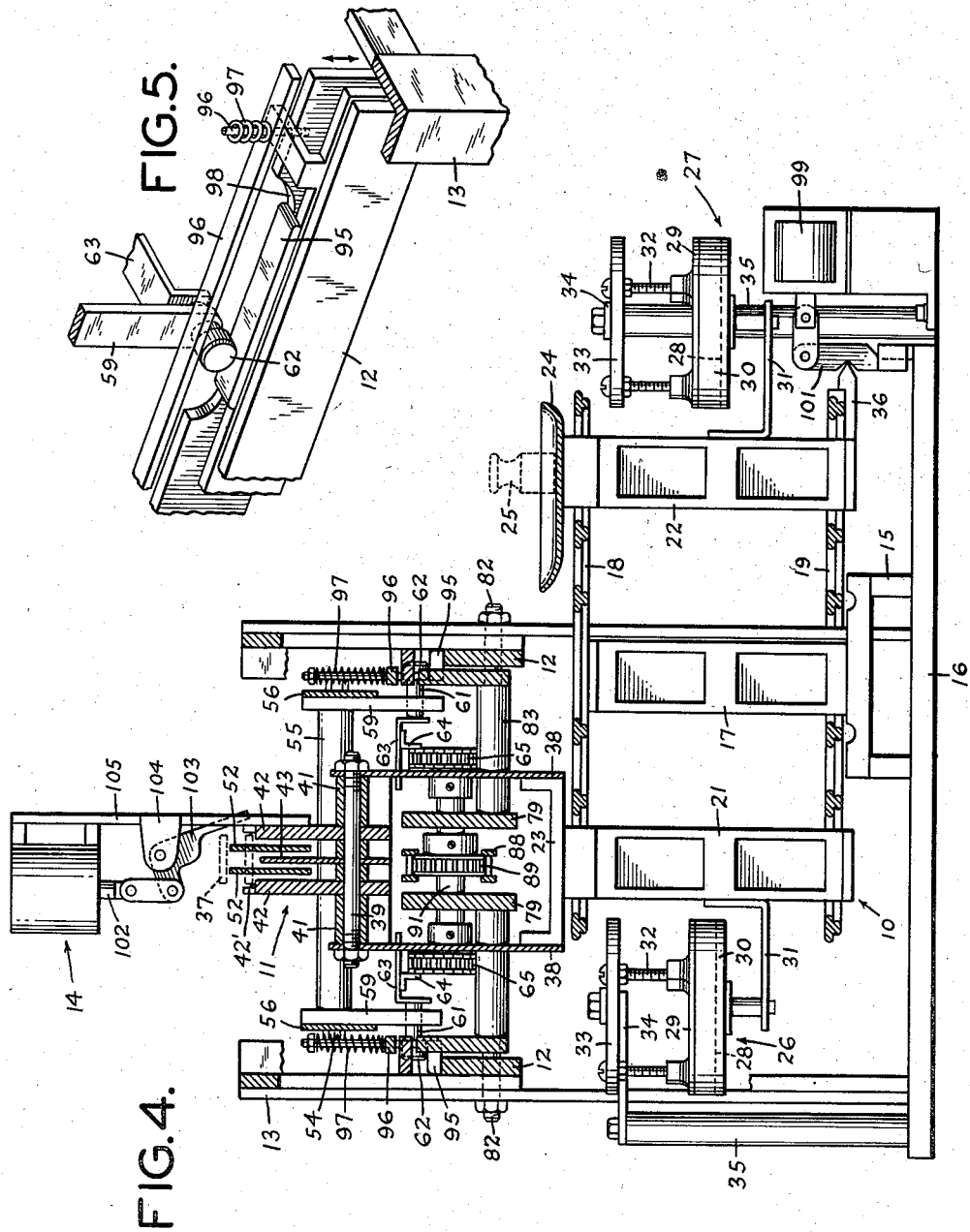

United States Patent Office 2,857,049
Patented Oct. 21, 1958

2,857,049

CHECK WEIGHERS

Harlan A. Hadley, Burlington, and Lester D. Singleton, Winooski, Vt., assignors, by mesne assignments, to Toledo Scale Corporation, Toledo, Ohio, a corporation of Ohio Application February 19, 1954, Serial No. 411,476

5 Claims. (Cl. 209—121)

Our invention relates to a weighing device and relates more particularly to a weighing device of the type employed for checking the weight of containers or packages of liquid or solid commodities.

A substantial proportion of the goods sold at retail are packaged by the producers or wholesalers and are sold to the public in the original packages or containers. Putting into the packages or containers a greater amount of the product than that intended, or called for on the receptacle, would be an economic loss to the packager, and putting in too little would be a violation of certain governmental weights and measures regulations or, at least, of the purchaser's faith in the marketers of the commodity. Accordingly, more and more packagers of commodities are resorting to the check weighing of their packages or containers. Ideally, each package or container should be check weighed. However, the check weighing devices heretofore developed have not been satisfactory. In such prior devices where accuracy was emphasized, the checking was slowed, and where speed of checking was effected inaccurate checking resulted.

It is an important object of our invention to provide an improved check weighing device which is simple in construction and which will rapidly and accurately check weigh packaged commodities or other articles of commerce.

In its broadest aspect, the check weighing device of our invention comprises a weighing mechanism having mounted in relation thereto a number of supports or stations, and a "walking beam" which moves the article to be check weighed from the receiving station, to which the article was fed by an automatic conveying means or manually, to the weighing station, and moves the article from the weighing station to the delivery station from which it may be discharged to a suitable conveying means or from which it may be removed manually.

Another object of our invention is the provision in a check weighing device of a receiving station, a weighing station and a delivery station each made of a plurality of spaced bars through the spaces between which bars operate the spaced bars of a walking beam for moving the article to be check weighed from one station to the other, and which may simultaneously move an article from the receiving station to the weighing station, an article from the weighing station to the delivery station, and an article from the delivery station to a conveying means.

Still another object of our invention is the provision of means for locking the lever of the weighing mechanism during the period when the walking beam is transferring articles from one station to another.

A further object of our invention is the provision of means for kicking off or rejecting articles which are above or below the predetermined weight.

Other objects of our invention, together with certain details of construction and combinations of parts, will appear from the following detailed description and will appear in the appended claims.

In the drawings, wherein a preferred embodiment of our invention is shown,

Fig. 1 is a top plan view of the check weighing device of our invention,

Figure 2:
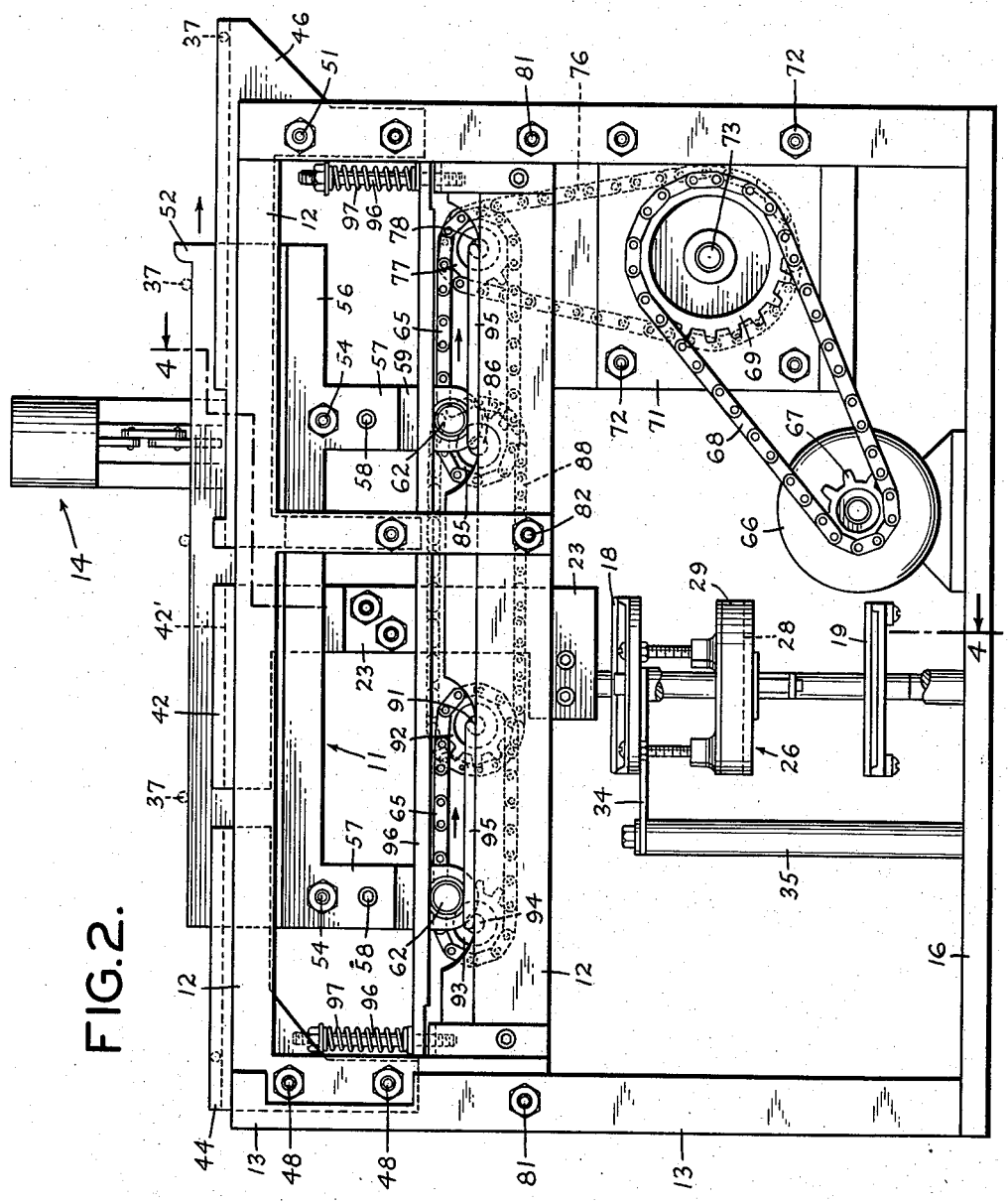
Fig. 2 is a side elevational view on a somewhat smaller scale.
Figure 6:
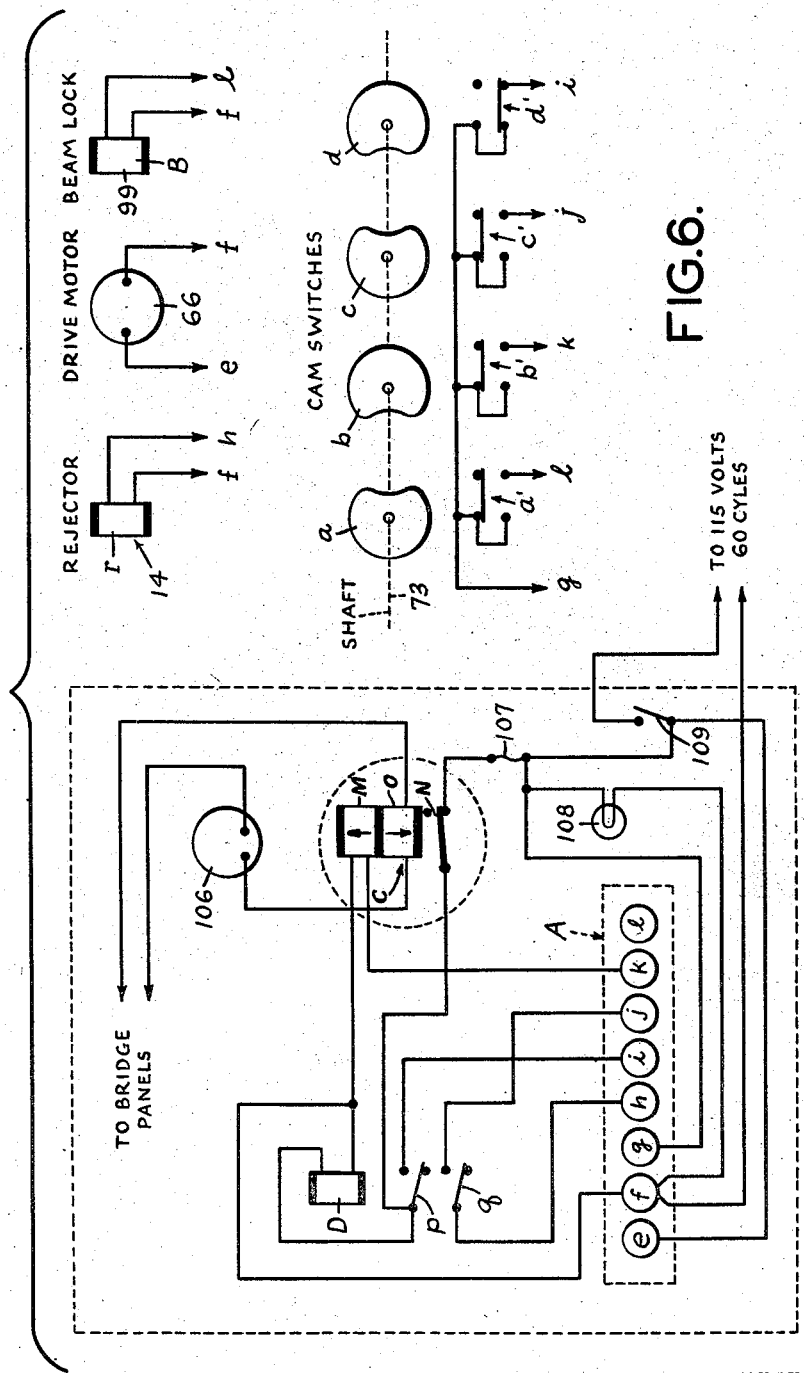

Fig. 3 is an end elevational view showing the means for operating the walking beam and also the cams and switches for controlling the operation of the locking mechanism and kicker, Fig. 4 is view taken along line 4—4 in Fig. 2 showing the weighing mechanism, Fig. 5 is a detail view of a portion of the walking beam operating means, and Fig. 6 is a schematic wiring diagram of the electric circuits employed in our check weighing device.

Like reference numerals indicate like parts throughout the several views of the drawings, and in the interest of clarity certain elements have been omitted from Figs. 1, 2 and 3.

Referring now to the drawings for a detailed description of our invention, the check weigher comprises a weighing mechanism generally indicated by reference numeral 10, a package or article forwarding arrangement or walking beam, generally indicated by reference numeral 11, mounted in a framework 12 supported on angle-iron standards 13, and a rejection device, generally indicated by reference numeral 14.

The weighing mechanism, which is best shown in Fig. 4, is substantially the same as that shown and described in application Ser. No. 126,809, filed November 12, 1949, now Patent No. 2,771,289, of Harlan A. Hadley. Thus, the weighing mechanism comprises an equal-arm balance, the scale elements of which are supported on a platform 15 fixed to a base 16. More particularly, the fulcrum stand 17 is fixed to the platform 15 and has pivotally supported thereon an equal-arm lever 18, a check link 19, and, connecting the lever and check link, stirrups or end parallels 21 and 22. As shown in our application Ser. No. 406,422, filed January 27, 1954, the elements of the weighing mechanism may comprise a lever 18 and a check link 19 of substantially the same construction, making them interchangeable, which are attached to the fulcrum stand 17 by metal bands suitably attached to said lever and said check link. Moreover, the stirrups are attached to said lever and said check link by metal bands carried at the ends of said lever and said check link.

The stirrup 21 is provided with a bracket 23 on which the load supporting means of the weighing mechanism, hereinafter described, is carried, and stirrup 22 has mounted thereon a pan 24 for holding a counterweight or check weight 25.

In the present check weigher, as in the weighing mechanism described in the above-mentioned application Ser. No. 126,809, the electrical means for indicating the balance of the lever comprises two capacitors, generally indicated by reference numerals 26 and 27, which are electrically connected to a suitable measuring device, such as a null reading meter in an appropriate bridge circuit. The capacitors 26 and 27 are substantially similar in construction and comprise two relatively movable plates 28 and 29, the lower plate 28 being flat and adapted to be received within the flange 30 of the upper plate 29. This construction of the capacitors gives them an added function, namely they act as air dash pots to dampen the oscillations of the scale elements. Each lower plate 28 of the capacitors is attached to the scale elements by a bracket arrangement 31 and each upper plate 29 is adjustably attached, as by screw bolts 32, to a disc 33 which is supported by an arm 34 fixed to a post 35 mounted on the base 16.

As is shown in Fig. 4, the check link 19 is provided with a tongue 36 which is one element of a means for locking the weighing mechanism against movement, as will hereinafter be described.

On the bracket 23 of the weighing mechanism is carried the load supporting means, i. e. the means for supporting the package or article 37 during the actual weighing operation. The load supporting means comprises a pair of uprights 38 which carry at the upper ends thereof a bolt 39 and spacers 41 which act to hold in position parallel spaced bars 42 and intermediate bar 43. The bars 42 may be grooved, as shown at 42' in Fig. 1, to receive therein the article 37 to be check weighed.

Carried by the framework of the check weigher in operative relation to the load supporting bars 42 and 43 are the bars 44 and 45 of the receiving station and the bars 46 and 47 of the delivery station. The bars 44 and 46 are of substantially the same type as bars 42, and bars 45 and 47 are like bar 43. The bars 44 and 45 are angular in shape and are held in position in the framework by bolts 48 and spacers 49. The bars 46 and 47 are also held in position by bolts and spacers, the bolts being indicated by reference numeral 51 in Fig. 2.

The walking beam, which transports the article being check weighed from station to station, comprises a pair of bars 52 adapted to operate between the bars of each station, i. e. within the spaces formed by bars 44 and 45, bars 42 and 43, and bars 46 and 47. The bars 52 operate to lift an article from the receiving station, carry the article to the bars of the load supporting station of the weighing mechanism, and to deposit it there. Simultaneously with this action, the bars 52 of the walking beam lift an already check weighed article from the load supporting station, which article had previously been deposited thereon by the walking beam, transport it to the delivery station. The article is pushed off the delivery station by movement of the forward ends of bars 52.

In order to perform the article lifting and transporting functions set forth above, means are provided to give the bars 52 an angular movement in a vertical plane, moving them between the spaces of the bars, forming the several stations, first in an upward and forward direction. In their upward and forward movement, the bars 52 move above the station bars and lift an article therefrom to transport the same from one station to another. Then the means for moving bars 52 move said bars in a downward and rearward direction. In this latter movement, the bars 52 move below the upper edges of the station bars causing the article to be deposited on said station bars at a position in advance of the position or station from which it was lifted.

To move walking beam bars 52 as set forth above, the said bars are attached to bolts 54 having spacers 55 thereon, which bolts are attached to bars 56. The bars 56 have dependent portions 57 which are fixed, as by bolts 58, to arms 59. At the lower extremities of the arms 59 are rotatably carried stub shafts 61 at the outside end of each of which is mounted a roller 62 and at the inside end a bracket 63. An angle iron member 64 is employed to attach the bracket 63 to a link of an articulated chain 65. It will be seen, particularly in Fig. 1, that there are four of each of the elements set forth above for operating the walking beam.

The movement of the articulated chains 65, and thus the walking beam, is effected through a motor 66 which through sprocket 67 and articulated chain 68 drives a sprocket 69 on the outside of a plate 71 attached by bolts 72 to the framework and standards of the machine. The sprocket 69 is fixed to and is adapted to rotate a shaft 73, journaled in plate 71, to which there is also fixed a sprocket 74 and a series of cams, generally indicated by reference numeral 75, the function of which will be hereinafter set forth. An articulated chain 76 is trained over sprocket 74 and a sprocket 77 fixed to a shaft 78 which is journaled in bars 79 held in position in the framework by bolts 81, bolts 82 and spacers 83. Sprockets 84 are fixed to shaft 78 and are rotated thereby. Articulated chains 65 are trained over sprockets 85 and rotate the same as well as shaft 86 on which they are mounted. Also mounted on shaft 86 is a sprocket 87 which through articulated chain 88 is adapted to rotate sprocket 89 fixed to a shaft 91 journaled in bars 79. On this shaft 91 are also fixed sprockets 92 which through articulated chains 65 rotate sprockets 93 on shaft 94.

In operation of the walking beam, the articulated chains 65 are driven by the motor 66 and the articulated chain and sprocket system and are caused to travel in the direction of the arrows shown in Fig. 2. By virtue of the brackets 63, tying all of the articulated chains 65 to the arms 59, the arms 59 and bars 52 are given a movement in the direction of the arrows in the raised position, as shown in Fig. 2. In this raised position, i. e. above the bars of the several stations, the rollers 62 move along a surface 95, on framework 12, provided for each of the rollers. When the rollers reach the end of the surfaces 95, they quickly drop, under the influence of resiliently held rods 96, which are biased by expansible springs 97, onto a surface 98 curved at the ends thereof (see Fig. 5). With the dropping of the rollers 62 onto surfaces 98, the bars 52 drop below the upper edges of the bars of the several stations, the bars 52 remaining in the lowered position until the chains 65 bring the roller 62 to the curved end at the left of Fig. 5. This curved end lifts the roller 62 back onto the surface 95, and the cycle begins again. As stated above, the moving bars 52 in their raised position lift and transport the articles 37 to be check weighed from one station to another, and the moving bars 52 in their lowered position have left the articles onto advanced stations when the upper edges of said bars drop below the upper edges of the bars of the stations.

As is stated above, the shaft 73 rotates a series of cams 75, specifically indicated as cams $a$, $b$, $c$ and $d$. The cams operate switches $a'$, $b'$, $c'$ and $d'$, respectively (see Fig. 6 where the cams, switches and other electrical elements are shown schematically). The switches $a'$, $b'$, $c'$ and $d'$ are connected to panel A, as are all other leads of the electrical system operated by the cams.

In operation of the cams, cam $a$ closes switch $a'$ energizing solenoid 99, the coil B of which is connected across terminals $f$ and $l$ of panel A, to withdraw the latch 101 from tongue 36 thus unlocking the lever system to permit the indicating member to assume the true weighing position. At the end of the weighing cycle, further rotational movement of cam $a$ opens switch $a'$, again locking the lever system. Meanwhile cam $b$ closes switch $b'$, thus closing the circuit through coil $m$ of Sensitrol relay C and energizing the coil to reset the contacts of said relay C. This latter relay is actuated only when the bridge circuit, in application Ser. No. 126,809, is out of balance, i. e. when the lever of the scale mechanism is out of balance. When the coil $m$ of relay C is energized it opens contacts $n$. If the bridge circuit is in balance, i. e. if the lever of the scale mechanism is in balance, contacts $n$ remain open. However, if the lever is out of balance, current is caused to flow through coil $o$, causing contacts $n$ to close. Upon the closing of contacts $n$, relay D is energized thus closing its contacts $p$ and $q$ which contacts are held closed by current flow through hold contact $p$ that is always in circuit with terminal $i$. Now, when cam $c$ closes switch $c'$ the coil $r$ of rejection device is energized causing core 102 to operate the kicker or ejector 103, which is pivoted in ears 104 of a supporting bracket 105, to reject an article 37.

Cam $d$ operates switch $d'$ to open the circuit through the rejection device restoring it to inoperative position if it has operated to reject the article, i. e. cam $d$ operates to clear the circuit for the next cycle of operation.

In the circuit diagram of Fig. 6, reference numeral 106 indicates a null reading meter with a central zero, reference numeral 107 a fuse, reference numeral 108 an indicating lamp and reference numeral 109 a power line switch.

With regard to the operation of the check weigher of our invention, it is believed that it will be evident from the description given above.

The embodiment of our invention above described in connection with the drawings is to be regarded as illustrative only since our invention is susceptible to variation, modification and change within the spirit and scope of the appended claims.

Having described our invention, what we claim as new and desire to secure by Letters Patent of the United States is:

1. In a check weigher of the class described for automatically check weighing articles, the combination with a weighing mechanism, of a load supporting platform supported by said weighing mechanism, an article receiving station, an article delivery station, said platform and said stations comprising spaced bars, a transfer member, comprising a plurality of bars operating between the spaces of the bars of said platform and said stations, for transporting from said receiving station to said platform and from said platform to said delivery station, and means for continuously operating said transfer means, said transfer member operating means including a plurality of articulated chains, means connecting said chains and said bars of said transfer member, and driving means for moving said chains.

2. In a check weigher of the class described for automatically check weighing articles, the combination with a weighing mechanism, of a load supporting platform supported by said weighing mechanism, an article receiving station, an article delivery station, said platform and said stations comprising spaced parallel bars, a transfer member, comprising a plurality of bars operating between the spaces of the bars of said platform and said stations, for transporting from said receiving station to said platform and from said platform to said delivery station, and means for continuously operating said transfer means, said transfer member operating means including a plurality of angularly movable articulated chains, a bracket attached to each of said chains and to said bars of said transfer member, a roller attached to each bracket, means for causing said rollers to move in a predetermined path, and driving means for moving said chains.

3. In a check weigher of the class described for automatically check weighing articles, the combination with a weighing mechanism, of a load supporting platform supported by said weighing mechanism, and an article receiving station, an article delivery station, said platform and said stations comprising spaced parallel bars, a transfer member, comprising a plurality of bars operating between the spaces of the bars of said platform and said stations, for transporting from said receiving station to said platform and from said platform to said delivery station, and means for continuously operating said transfer means, said transfer member operating means including a plurality of angularly movable articulated chains, a bracket fixed to each of said chains and pivotally attached to the bars of said transfer member, a roller attached to each bracket, spring-pressed means for causing said rollers to move in a predetermined path, and driving means for moving said chains.

4. In a check weigher of the class described for automatically check weighing articles, the combination with a weighing mechanism, of a load supporting platform supported by said weighing mechanism, an article receiving station, an article delivery station, said platform and said stations comprising spaced parallel bars, a transfer member, comprising a plurality of bars operating between the spaces of the bars of said platform and said stations, for transporting from said receiving station to said platform and from said platform to said delivery station, and means for continuously operating said transfer means, said transfer member operating means including a plurality of articulated chains, means connecting said chains and said bars of said transfer member, and driving means for moving said chains, the construction and arrangement being such that the chains move in an orbital path and cause said transfer member to move in an upward and forward direction and then in a downward and rearward direction.

5. In a check weigher of the class described for automatically check weighing articles, the combination with a weighing mechanism, of a load supporting platform supported by said weighing mechanism, an article receiving station, an article delivery station, said platform and said stations comprising spaced parallel bars, a transfer member, comprising a plurality of bars operating between the spaces of the bars of said platform and said stations, for transporting from said receiving station to said platform and from said platform to said delivery station, and means for continuously operating said transfer means, said transfer member operating means including a plurality of angularly movable articulated chains, a bracket fixed to each of said chains and pivotally attached to the bars of said transfer member, a roller attached to each bracket, a spring-pressed means for causing said rollers to move in a predetermined path, and driving means for moving said chains, the construction and arrangement being such that the chains move in an orbital path, moving the rollers through their predetermined path whereby the bars of said transfer member are caused to move in an upward and forward direction and then in a downward and rearward direction.

References Cited in the file of this patent

UNITED STATES PATENTS

| | | |
|---|---|---|
| 1,858,619 | Delamere | May 17, 1932 |
| 1,908,843 | Hilgers | May 16, 1933 |
| 2,067,744 | Williams | Jan. 12, 1937 |
| 2,232,437 | Bushman | Feb. 18, 1941 |
| 2,246,597 | Niederer et al. | June 24, 1941 |
| 2,307,695 | Mansbendel | Jan. 5, 1943 |
| 2,381,035 | Campbell | Aug. 7, 1945 |
| 2,633,972 | Capstack | Apr. 7, 1953 |

FOREIGN PATENTS

| | | |
|---|---|---|
| 132,200 | Australia | Apr. 19, 1949 |

Disclaimer and Dedication 2,857,049.—*Harlan A. Hadley*, Burlington, and *Lester D. Singleton*, Winooski, Vt. CHECK WEIGHERS. Patent dated Oct. 21, 1958. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]